US005788164A

United States Patent [19]

Tomita et al.

[11] Patent Number: 5,788,164
[45] Date of Patent: Aug. 4, 1998

[54] ROTARY ATOMIZING ELECTROSTATIC COATING APPARATUS

[75] Inventors: Ichio Tomita, Aichi-ken; Isamu Yamasaki, Toyota; Hiroshi Aizawa, Fujisawa; Toshinori Satoh, Fujisawa; Atsushi Takahashi, Fujisawa, all of Japan

[73] Assignee: Toyota Jidosha Kabushiki Kaisha, Toyota, Japan

[21] Appl. No.: 768,584

[22] Filed: Dec. 18, 1996

[30] Foreign Application Priority Data

| Dec. 19, 1995 | [JP] | Japan | 7-330785 |
| Feb. 13, 1996 | [JP] | Japan | 8-025274 |
| Apr. 19, 1996 | [JP] | Japan | 8-098494 |

[51] Int. Cl.$^6$ ............................................. B05B 5/04
[52] U.S. Cl. ..................... 239/700; 239/112; 239/293; 239/223
[58] Field of Search ................... 239/700, 699, 239/690, 290, 293, 223, 104, 106, 112, 113

[56] References Cited

U.S. PATENT DOCUMENTS

| 4,337,895 | 7/1982 | Gallen | 239/223 X |
| 4,368,853 | 1/1983 | Morishita et al. | 239/223 X |
| 4,450,785 | 5/1984 | Meisner | 239/223 X |
| 4,572,437 | 2/1986 | Huber et al. | 239/223 X |
| 4,589,597 | 5/1986 | Robisch et al. | |
| 4,643,357 | 2/1987 | Culbertson et al. | 239/112 |
| 4,776,520 | 10/1988 | Merritt | 239/223 X |
| 4,936,509 | 6/1990 | Weinstein | 239/112 |

FOREIGN PATENT DOCUMENTS

| 3912700 | 10/1990 | Germany | 239/112 |
| 7-171483 | 7/1995 | Japan. | |
| 2 271 069 | 4/1994 | United Kingdom. | |

*Primary Examiner*—Kevin Weldon
*Attorney, Agent, or Firm*—Cushman Darby & Cushman IP Group of Pillsbury Madison & Sutro LLP

[57] ABSTRACT

A rotary atomizing electrostatic coating apparatus includes air feed passages connected to an air bearing, a turbine, and a shaping air cap, respectively. In any one of air feed passages, a divergence portion for causing a portion of air flowing in the one air feed passage to diverge from the one air feed passage is formed so that a diverging air flows into an interior of the drive shaft. As a result, it is not necessary to provide an additional, air feed passage and an air source therefor for preventing paint from entering a bearing clearance between the drive shaft and the air motor. As a result, a size of the apparatus will not be large and a cost of the apparatus will not substantially increase.

11 Claims, 7 Drawing Sheets

ROTARY ATOMIZING ELECTROSTATIC COATING APPARATUS

This application is based on Japanese Patent Applications HEI 7-330785 filed in Japan on Dec. 19, 1995, HEI 8-25274 filed in Japan on Feb. 13, 1996 and HEI 8-98494 filed in Japan on Apr. 19, 1996, the content of which is incorporated into the present application by reference.

BACKGROUND OF THE INVENTION

1. Field of the Invention

The present invention relates to a rotary atomizing electrostatic coating apparatus having a drive shaft floatingly supported by an air bearing, and more particularly, to a structure for preventing paint and/or thinner and foreign substance from entering a bearing clearance between the drive shaft and the air bearing.

2. Description of Related Art

A conventional rotary atomizing electrostatic coating apparatus includes an air motor, a bell head, a shaping air cap, and a high voltage generator, and a paint feed tube. For a bearing of the air motor, a static-pressure air bearing is usually used. In the air bearing, compressed air from an external air source is supplied to a clearance between the air bearing and the drive shaft to float the drive shaft, so that the air bearing operates in a non-contact and completely oil-less condition. However, since the air bearing has a smaller bearing clearance, more particularly, from several microns to a hundred microns at most, and a smaller load capacity than other type of bearings, even if a very small amount of paint and/or thinner and foreign substance enters the bearing clearance, a rotation trouble takes place at once.

To operate the rotary atomizing electrostatic coating apparatus having a bearing type of an air bearing, the apparatus should include at least two air passages independent of each other: one for supplying air to the air bearing and the other for supplying air to the turbine. In some cases, the apparatus may include a passage for feeding a brake air for reducing a rotational speed of the bell head. Some conventional apparatus further include an air feed passage for supplying air to an interior of the drive shaft in order to prevent paint and/or thinner from flowing reversely into the drive shaft and to improve feasibility of coating with the coating gun directed upwardly, as proposed in, for example, not yet published Japanese Patent Application No. HEI 5-317641. In that case, the apparatus is required to include an additional, particular air feed passage and an air source therefor.

However, the above-described apparatus having an additional, particular air feed passage and an air source therefor has the following problems:

First, because various kinds of structures and air feed passages are installed near the air motor, it is difficult to further install the additional air feed passage for preventing paint and/or thinner and foreign substance from entering the air bearing due to space requirement.

Second, even if the additional air feed passage can be installed in the apparatus, the installation will be accompanied by increasing the size of the apparatus and increasing cost.

SUMMARY OF THE INVENTION

An object of the present invention is to provide a rotary atomizing electrostatic coating apparatus capable of preventing paint and/or thinner and foreign substance from reversely flowing to an interior of a drive shaft, without being accompanied by increasing the size of the apparatus and increasing cost.

To achieve the above-described object, in a rotary atomizing electrostatic coating apparatus according to the present invention, air for preventing paint and/or thinner and foreign substance from flowing reversely to an interior of a hollow drive shaft is supplied to the interior of the drive shaft. The apparatus includes air feed passages disposed in a housing and connected to an air bearing, a turbine, and a shaping air cap, respectively. In any one of the air feed passages, a divergence portion for causing a portion of the air flowing in the one air feed passage to diverge from the one air feed passage is formed so that the diverging air flows to the interior of the drive shaft.

The one air feed passage includes an upstream portion located upstream of the divergence portion and a downstream portion located downstream of the divergence portion. Preferably, the upstream portion has a greater cross-section than the downstream portion.

Preferably, there is provided, a front and a rear radial bearing and one thrust bearing. The two radial bearings and the one thrust bearing rotatably and floatingly support the drive shaft. The thrust bearing is located between the two radial bearings. The housing includes, on a rear side of the rear radial bearing, a first housing portion where the divergence portion is disposed. The first housing portion and the drive shaft define a radial gap therebetween. The drive shaft includes a rear end. The housing includes a second housing portion which opposes a rear end of the drive shaft. The rear end of the drive shaft and the second housing portion define an axial gap therebetween which communicates with the radial gap. The first housing portion has an air nozzle formed therein for causing the diverging air to flow into the radial gap.

Preferably, the radial gap has a greater gap thickness (gap size) than the axial gap.

Preferably, the respective feed tubes for supplying paint and thinner to a bell head are disposed in the drive shaft. The drive shaft includes a portion which has a tapered inside surface gradually increasing in diameter in a direction toward the front end of the drive shaft.

Alternatively, the drive shaft may include a portion which has an inside surface where a spiral groove is formed. The spiral groove extends spirally so as to approach the front end of the drive shaft in a direction reverse to a direction of rotation of the drive shaft.

Preferably, the drive shaft and the air bearing have a bearing clearance therebetween, and an air seal mechanism for forming an air curtain over an entire circumference around the drive shaft is disposed on a bell head side of the bearing clearance.

In the above-described apparatus according to the present invention, since a portion of any one of air flowing to the air bearing, the turbine, and the shaping air cap is caused to diverge at the divergence portion and to flow into the interior of the drive shaft to form a paint reverse flow prevention air, it is not necessary to provide an additional, particular air feed passage and an air source therefor for preventing paint and/or thinner and foreign substance from entering the bearing clearance. As a result, the cost and the size of the apparatus will not be substantially increased.

In the case where the upstream portion has a greater cross section than the downstream portion, even if the amount of air flowing in the air feed passage where the divergence portion is formed is increased by the amount of the paint reverse flow prevention air, a pressure loss at the divergence portion and an upstream thereof will be small. As a result, the pressure at an inlet to one of the air bearing, the turbine, and the shaping air cap connected to the air passage where the divergence portion is formed is low, so that a stable operation of the one of the air bearing, the turbine, and the shaping air cap can be obtained.

In the case where the air bearing is intercepted from a rear end of the interior of the drive shaft by the axial gap and the radial gap, even if paint and/or thinner and foreign substance enters the interior of the drive shaft and reaches the rear end of the interior of the drive shaft, the paint and/or thinner and foreign substance is prevented from reaching the air bearing.

In the case where the drive shaft includes a portion having a tapered inside surface, when the drive shaft is rotated at high speed, a centrifugal force acts on the paint and/or thinner and foreign substance adhering to the inside surface of the drive shaft to cause the adhering paint and/or thinner and foreign substance to flow toward a large diameter portion, i.e., toward the front end of the drive shaft, to finally exhaust it to an outside.

In the case where the drive shaft includes a portion having a spiral groove, when the drive shaft is rotated at a high speed, a centrifugal force acts on the paint and/or thinner and foreign substance adhering the inside surface of the drive shaft, so that the adhering paint and/or thinner and foreign substance is biased into a valley of the groove. Since an inertia of the paint and/or thinner and foreign substance in the valley of the groove operates so as to cause the paint and/or thinner and foreign substance to stay at its current position, when the drive shaft is rotated at a high speed, the paint and/or thinner and foreign substance is caused to move in a direction reverse to the direction of rotation of the drive shaft and flows toward the front end of the drive shaft in the groove, to at last flow out to an outside.

In the case where the air seal mechanism is disposed on a bell head side of the bearing clearance, an air seal (an air curtain) generated by the air seal mechanism prevents paint and/or thinner and foreign substance from entering the bearing clearance. As a result, the air bearing is prevented from being damaged.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which.

DETAILED DESCRIPTION OF THE PREFERRED EMBODIMENTS

Figure 1:
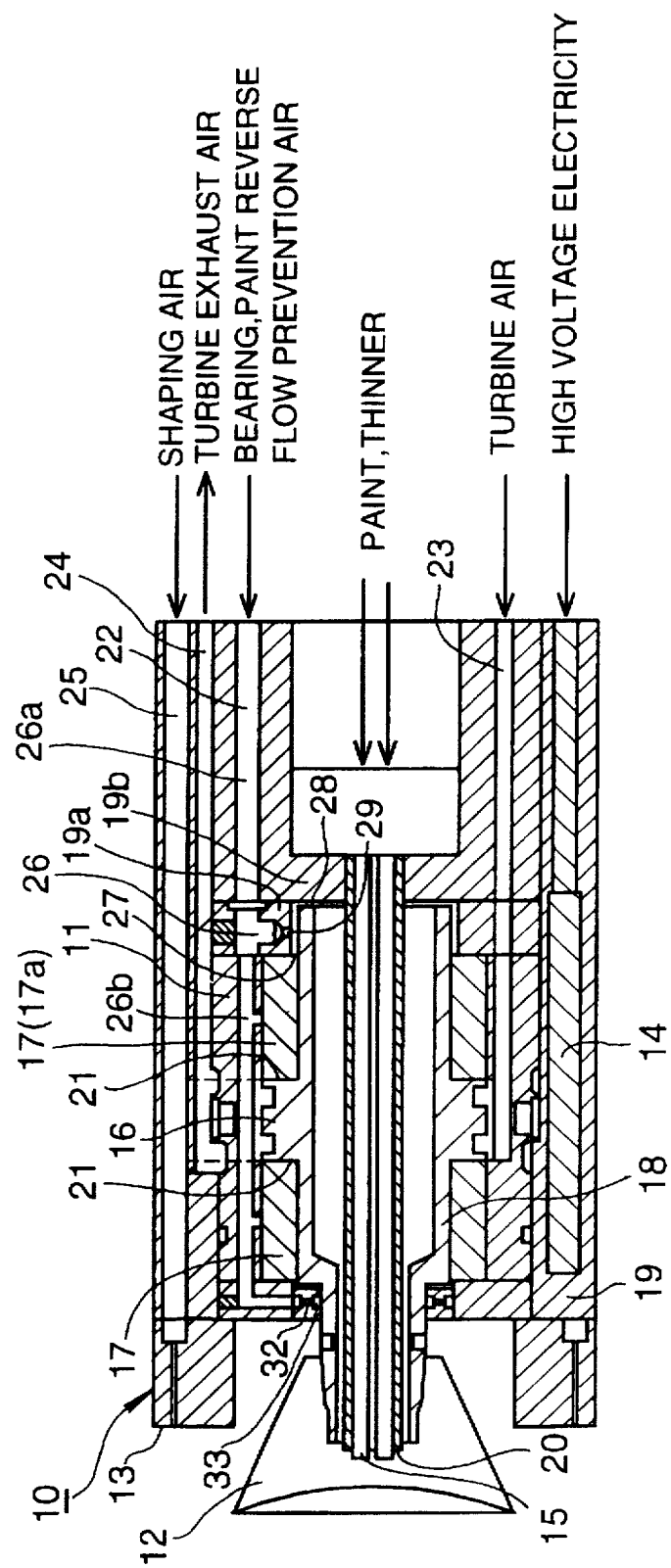
FIG. 1 is a cross-sectional view of a rotary atomizing electrostatic coating apparatus in accordance with a first embodiment of the present invention.

Rotary atomizing electrostatic coating apparatus according to several embodiments of the present invention will be explained with reference to FIGS. 1–9. Portions common or similar to all of the embodiments of the present invention are denoted with the same reference numerals throughout all of the embodiments of the present invention.

Figure 3:
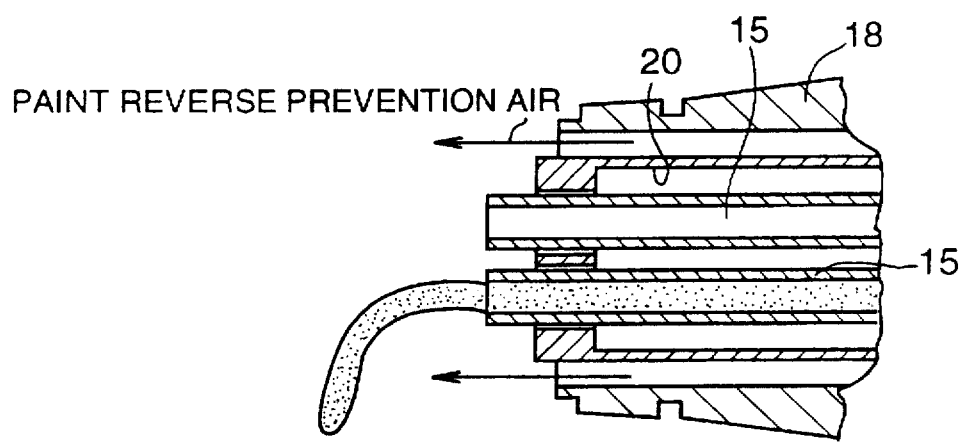
FIG. 3 is a cross-sectional view of a front end of the rotary atomizing electrostatic coating apparatus of the invention, showing paint flowing out from a front end of a paint feed tube in a case where an amount of a paint reverse flow prevention air is in an optimum range.
Figure 4:
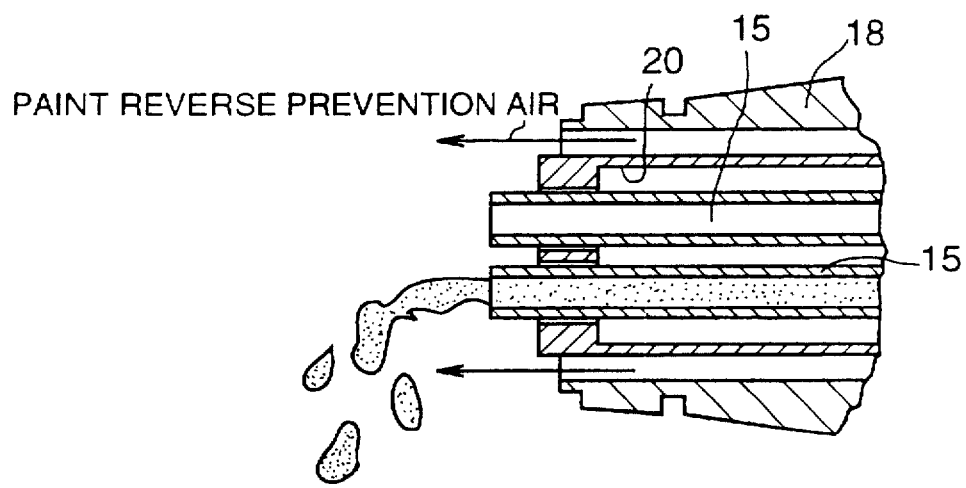
FIG. 4 is a cross-sectional view of a front end of the rotary atomizing electrostatic coating apparatus of the invention, showing a paint flowing out from a front end of a paint feed tube in a case where an amount of paint reverse flow prevention air is out of the optimum range.

First, portions common or similar to all of the embodiments of the present invention will be explained with reference to, for example, FIGS. 1, 3 and 4.

As illustrated in FIG.1, a rotary atomizing electrostatic coating apparatus 10 according to any one of the present invention includes a housing 19, a hollow drive shaft 18 having an interior and rotatably and floatingly supported by at least one radial static-pressure air bearing 17 from the housing, a thrust static-pressure air bearing 21 for floatingly supporting the drive shaft 18 in an axial direction, a bell head 12 (a rotary atomizing head) coupled to a front end of the drive shaft 18 so as to rotate together with the drive shaft 18, an air motor 11 for rotationally driving the drive shaft 18, a paint feed tube 15 for supplying paint to the bell head 12 and a thinner feed tube 20 for supplying thinner to the bell head 12 respectively extending through the drive shaft 18, a shaping air cap 13 for injecting a shaping air against the radially outwardly flying paint scattered from a front end of the bell head 12 to shape a flying pattern of the paint, and a high voltage generator 14 generating a high voltage to afford an electric charge to an atomized paint scattered from the bell head 12.

The rotary atomizing electrostatic coating apparatus 10 further includes a bearing air feed passage 22 for feeding bearing air to the at least one radial static-pressure air bearing 17 (hereinafter, radial bearing) and the thrust static-pressure air bearing (hereinafter, thrust bearing) 21, a turbine air feed passage 23 for feeding turbine air to a turbine 16 of the air motor 11 and a turbine air exhaust passage 24 for exhausting the turbine air after the turbine air has worked to rotate the turbine, and a shaping air feed passage 25 for feeding a shaping air to the shaping air cap 13. A portion of each passage 22, 23, 24, 25 is formed in the housing 19.

In order to prevent paint and/or thinner from flowing reversely or to improve feasibility of coating with the coating gun directed upwardly, compressed air (hereinafter, paint reverse flow prevention air) is fed to an interior of the drive shaft 18. In any one of the air feed passages 22, 23 and 25 for feeding air to the air bearing, the turbine, and the shaping air cap, respectively, a divergence portion 26 for causing a portion of air flowing in the one air passage 22, 23 and 25 to diverge from the one air passage is formed so that the diverging air flows to the interior of the drive shaft 18 as a paint reverse flow prevention air. In this connection, at least a portion of an air feed passage for feeding the paint reverse flow prevention air to the interior of the drive shaft 18 and an air source therefor are common in structure with a portion of the one air feed passage where the diverging portion 26 is formed and the air source therefor. Therefore, any particular air passage and air source therefor for the paint reverse flow prevention air are not provided. As a result, installing the air passage for the paint reverse flow prevention air will not or only minutely increase the size the housing and increase the manufacturing cost.

The air feed passage where the divergence portion 26 is formed has an upstream portion 26a located upstream of the divergence portion 26 and a downstream portion 26b located downstream of the divergence portion 26. The upstream portion 26a has a greater cross-section (transverse cross-section of a passage) than the downstream portion 26b.

Since a considerably large amount (for example, 5–100 l/min) of air is needed for the paint reverse flow prevention air, a pressure loss and a flow resistance due to the paint reverse flow prevention air should be taken into account when both of the paint reverse flow prevention air and one of the bearing air, the turbine air, and the shaping air flow in the common passage. If the upstream portion 26a had the same diameter as that in a case where no paint reverse flow prevention air flows in the portion, it would be very difficult to assure a necessary pressure at an inlet of the one of the air bearing, the turbine, and the shaping air cap. However, in any embodiment of the present invention, since the upstream portion 26a has a greater cross-section than the downstream portion 26b, a pressure loss and a flow resistance at the upstream portion 26a is small. As a result, it is possible to assure a required pressure at the inlet of one of the air bearing, the turbine, and the shaping air cap.

The drive shaft 18 is rotatably and floatingly supported by two radial bearings 17 (a front radial bearing and a rear radial bearing 17a) axially spaced from each other and one thrust bearing 21 disposed between the two radial bearings 17. The housing 19 includes a first housing portion 19a on a rear the of the rear radial bearing 17a, and the divergence portion 19 is disposed at the first housing portion 19a. A radial gap 27 is defined between the first housing portion 19a and the drive shaft 18. The housing 19 further includes a second housing portion 19b opposite to a rear end of the drive shaft 18. An axial gap 28 is defined between the rear end of the drive shaft 18 and the second housing portion 19b. The axial gap 28 communicates with radial gap 27. In the first housing portion 19a, an air nozzle 29 is formed for causing the paint reverse flow prevention air which has diverged at the divergence portion 26 to flow into the radial gap 27. Preferably, the radial gap 27 has a greater gap thickness than the axial gap 28, so that the air can flow substantially evenly into the interior of the drive shaft 18 from the axial gap 28 to thereby increase a seal effect.

In the seal structure, the paint reverse flow prevention air diverges at the divergence portion 26 and is injected into the radial gap 27 through the air nozzle 29, then flows through the axial gap 28 into the interior of the drive shaft round the rear end of the drive shaft 18, and then flows out from the front end of the drive shaft 18. When the air flows out from the front end of the drive shaft 18, it prevents paint and/or thinner from reversely flowing into the interior of the drive shaft 18.

At a front end of the air motor also, a paint reverse flow prevention air is injected through an orifice 32 into a chamber (or recess) 33 where the air flows in a circumferential direction in the chamber 33 and flows out to the outside.

There is an optimum range for a flow amount of the paint reverse flow prevention air. Though the range differs corresponding to a size and a structure of the drive shaft and the paint feed tube, usually the flow amount is in the range of 5–100 l/min. If the flow amount is smaller than a lower limit of the range, the air cannot sufficiently perform a paint reverse flow prevention operation. On the contrary, if the flow amount is larger than an upper limit of the range, injection of the paint will be unstable as illustrated in FIG. 4. FIG. 3 illustrates a case where the flow amount is in the optimum range and injection of the paint is stable.

In a conventional coating apparatus where a paint reverse flow prevention air is introduced into an interior of a drive shaft without using a radial gap and an axial gap, or where a paint flow prevention air is introduced into an interior of a drive shaft at an axially intermediate portion of the drive shaft, once paint and/or thinner gets into the interior of the drive shaft, the paint and/or thinner will flow to a rear radial bearing in a moment due to a centrifugal force generated on the paint and/or thinner, resulting in that the drive shaft is impossible to rotate. In contrast, in any embodiment of the present invention, since the rear bearing 17a is intercepted by two stages from the interior of the drive shaft 18 by the axial gap 28 and the radial gap 27, even if paint and/or thinner reversely flow into the interior of the drive shaft 18, the paint and/or thinner does not reach the rear bearing 17a, so that the drive shaft maintains its rotatability.

Next, portions unique to each embodiment of the present invention will be explained.

With the first embodiment of the present invention, as illustrated in FIG. 1, the divergence portion 26 is disposed in the bearing air feed passage 22. The diverging passage is connected to the air nozzle 29, so that the paint reverse flow prevention air flows through the air nozzle 29 into the radial gap 27, and then through the axial gap 28 into the interior of the drive shaft 18.

Figure 2:
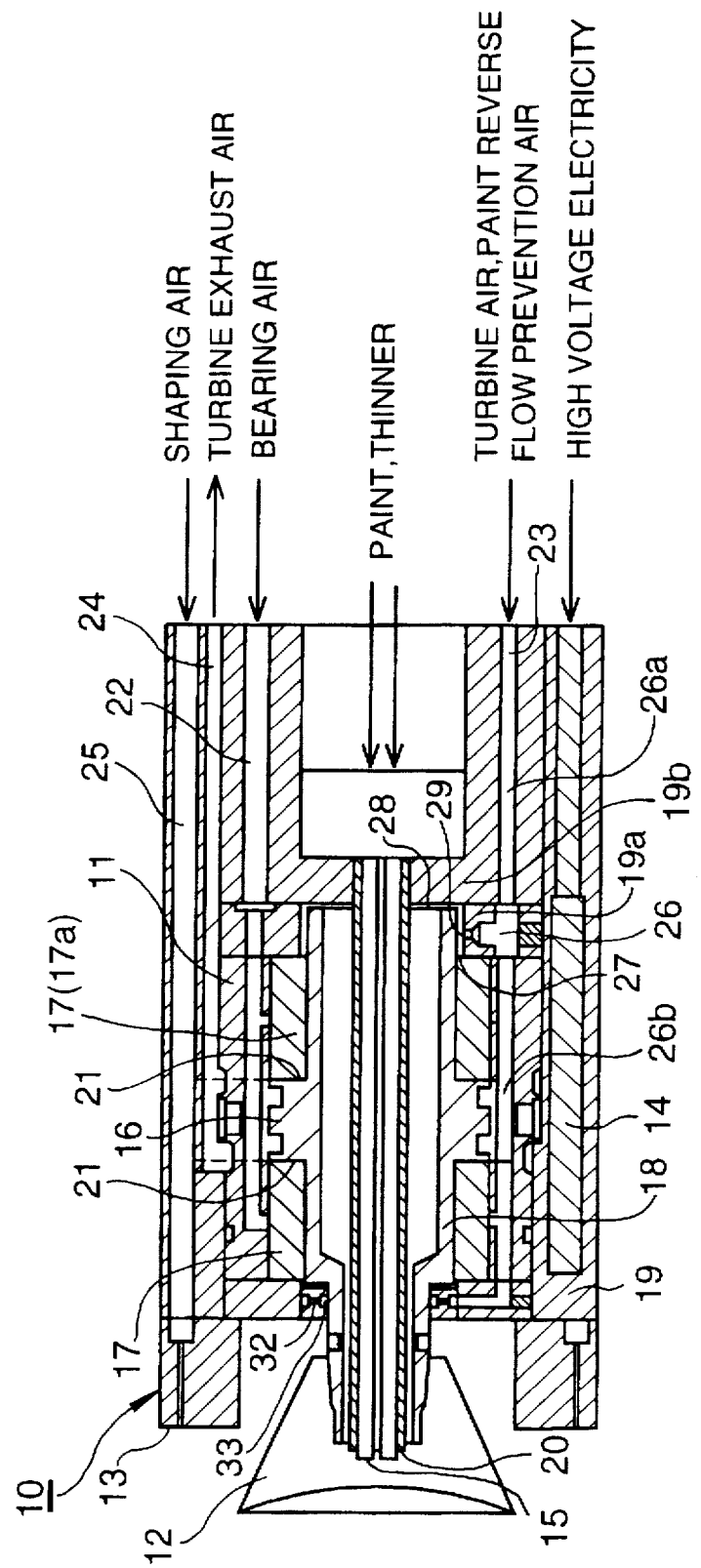
FIG. 2 is a cross-sectional view of a rotary atomizing electrostatic coating apparatus in accordance with a second embodiment of the present invention.

With the second embodiment of the present invention, as illustrated in FIG. 2, the divergence portion 26 is disposed in the turbine air feed passage 23. The diverging passage is connected to the air nozzle 29, so that the paint reverse flow prevention air flows through the air nozzle 29 into the radial gap 27, and then through the axial gap 28 into the interior of the drive shaft 18.

In a case where a shaping air feed passage 25 is formed in the air motor, the divergence potion 26 may be disposed in the shaping air feed passage. In that case, the divergence portion 26 is disposed in the air motor.

Figure 5:
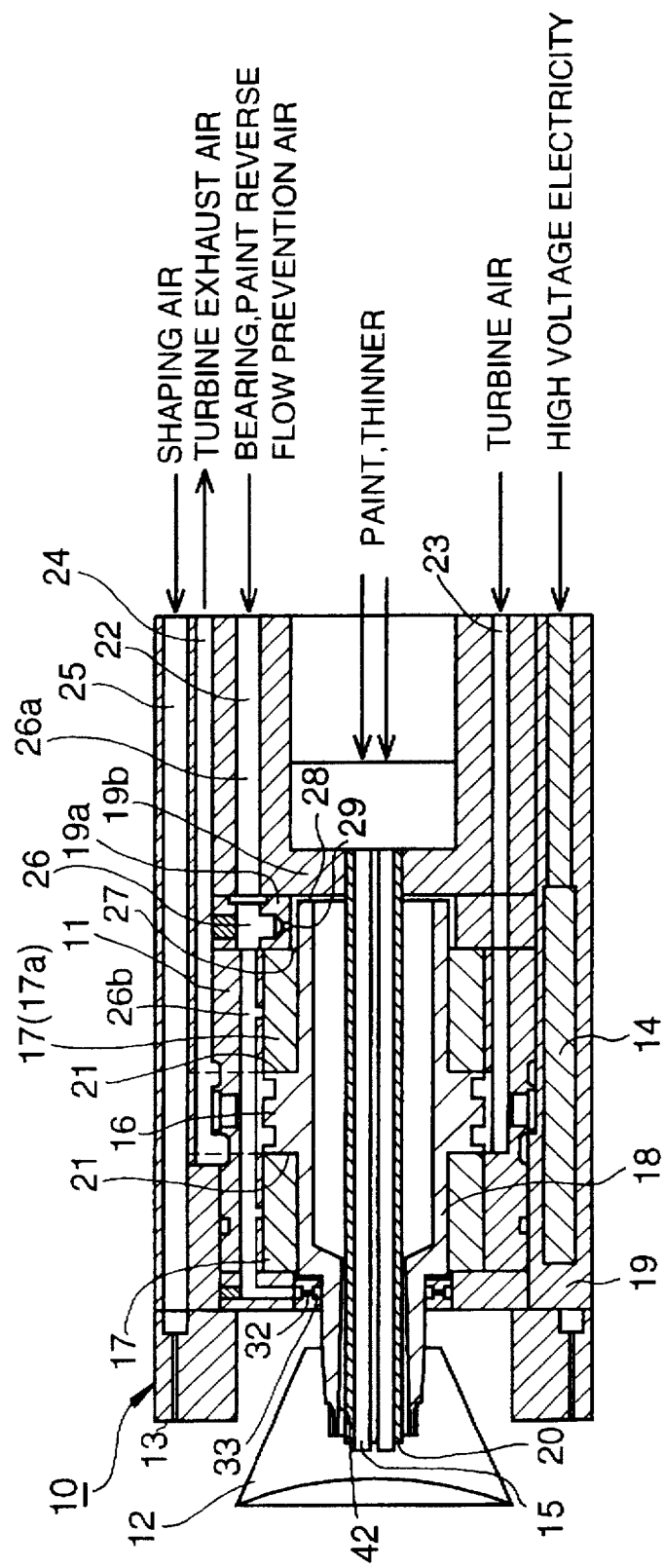
FIG. 5 is a cross-sectional view of a rotary atomizing electrostatic coating apparatus in accordance with a third embodiment of the present invention.
Figure 6:
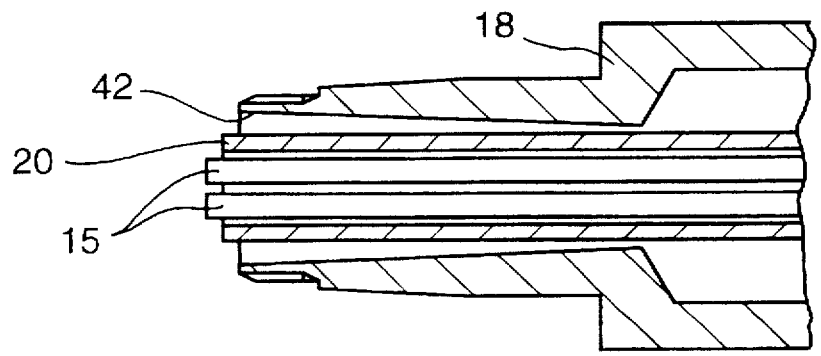
FIG. 6 is an enlarged cross-sectional view of a front end of a drive shaft and its vicinity of the apparatus of FIG. 5.

With the third embodiment of the present invention, as illustrated in FIGS. 5 and 6, the feed tube 15 and 20 for feeding paint and thinner, respectively, to the bell head are disposed within the drive shaft 18. Further, the drive shaft 18 has a front end portion (a front end itself and a portion of the shaft adjacent the front end) having an inside surface which is tapered so as to increase in diameter in a direction toward the front end of the drive shaft. The tapered portion is denoted with reference numeral 42.

In the third embodiment of the present invention, even if paint and/or thinner flows reversely into the interior of the drive shaft 18, when the drive shaft 18 is rotated at a high speed, a centrifugal force acts on the paint and/or thinner adhering to the inside surface of the drive shaft and biases the adhering paint and/or thinner toward a larger diameter portion, i.e., toward the front end of the drive shaft. The paint and/or thinner biased toward the front end of the drive shaft at last flows out to an interior of the bell head 12, i.e., an outside of the drive shaft from the front end of the drive shaft.

Due to both the paint and/or thinner exhausting operation by the tapered portion 42 and the paint and/or thinner reverse flow prevention operation by the paint reverse flow prevention air, the paint and/or thinner is prevented from flowing reversely into the interior of the drive shaft and then to the rear radial bearing 17.

Figure 7:
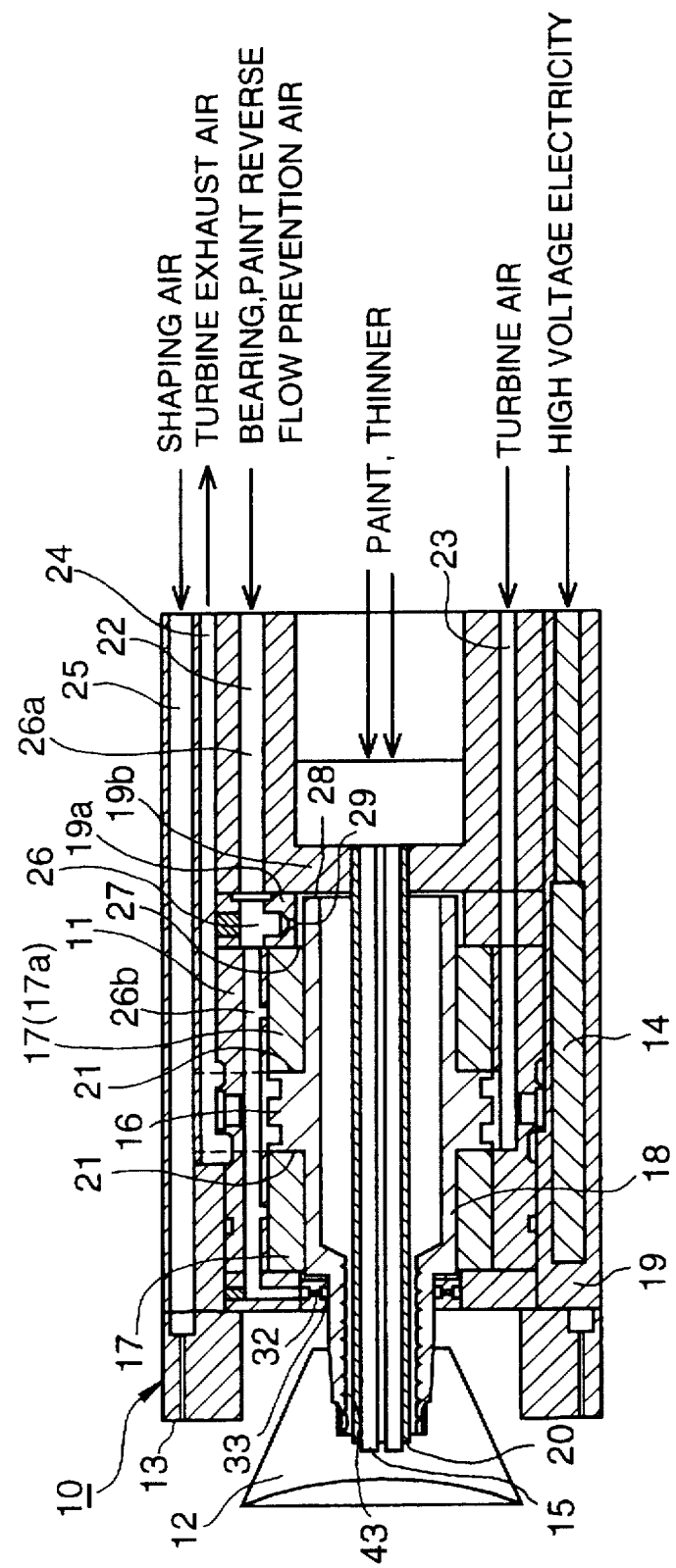
FIG. 7 is a cross-sectional view of a rotary atomizing electrostatic coating apparatus in accordance with a fourth embodiment of the present invention.
Figure 8:
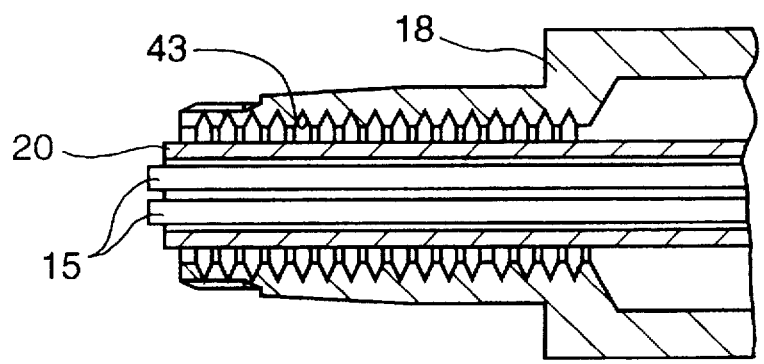
FIG. 8 is an enlarged cross-sectional view of a front end of a drive shaft and its vicinity of the apparatus of FIG. 7.

With the fourth embodiment of the present invention, as illustrated in FIGS. 7 and 8, the feed tube 15 and 20 for feeding paint and thinner, respectively, to the bell head are disposed within the drive shaft 18. Further, the drive shaft 18 has a front end portion (a front end itself and a portion of the shaft adjacent the front end) having an inside surface where a spiral groove 43 is formed. The groove 43 spirally extends so as to approach the front end of the drive shaft in a direction reverse to the direction of rotation of the drive shaft 18.

In the fourth embodiment of the present invention, even if paint and/or thinner flows reversely into the interior of the drive shaft 18, when the drive shaft 18 is rotated at a high speed, a centrifugal force acts on the paint and/or thinner adhering to the inside surface of the drive shaft, whereby the adhering paint and/or thinner is pushed to a surface of a valley of the spiral groove 43. Since an inertia of the adhering paint and/or thinner acts to cause the paint and/or thinner to stay at its current position, when the drive shaft 18 rotates, the paint and/or thinner moves in a direction reverse to the direction of rotation of the drive shaft (pumping action by the spiral groove) in the groove 43, and at last is exhausted from the front end of the drive shaft to the outside.

Due to both the paint and/or thinner exhausting operation by the spiral groove 43 and the paint and/or thinner reverse flow prevention operation by the paint reverse flow prevention air, the paint and/or thinner is prevented from flowing reversely into the interior of the drive shaft and then to the rear radial bearing 17.

Figure 9:
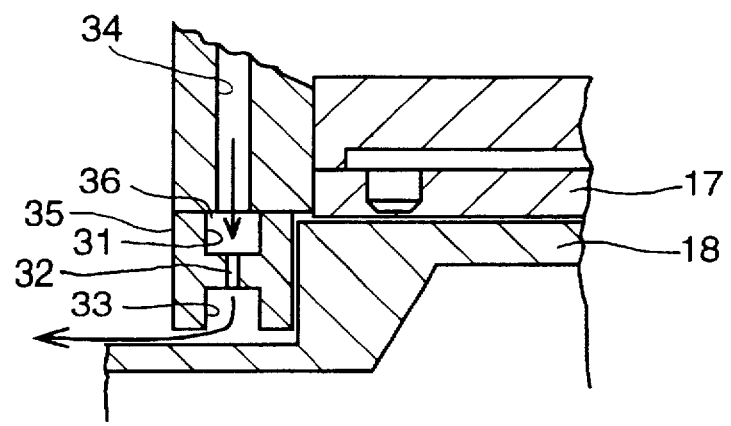
FIG. 9 is an enlarged cross-sectional view of a front end of an air bearing and its vicinity of a rotary atomizing electrostatic coating apparatus in accordance with a fifth embodiment of the present invention.

With a fifth embodiment of the present invention, as illustrated in FIG. 9, a structure for preventing paint and/or thinner from entering the air bearing from a front end of the air bearing is further provided. The structure includes a paint adhesion preventing cover 35 and an air seal mechanism 36.

The paint adhesion preventing cover 35 is coupled to a radially inner portion of a front end of a body of the air motor 11 and covers a clearance between the drive shaft 18 and the air bearing 17 from a front side of the clearance. The cover 35 may be formed by utilizing a member other than the air motor, for example, a portion of the housing which is positioned between the air motor and the shaping air cap. The paint adhesion preventing cover 35 is a static member. A small clearance is provided between an inside surface of the cover 35 and an outside surface of the drive shaft 18 so that the cover 35 does not contact the drive shaft 18.

As illustrated in FIG. 9, the air seal mechanism 36 blows out air to make an air seal (an air curtain) over an entire circumference around the drive shaft 18 to prevent paint and/or thinner and foreign substances from entering the air bearing 17. The air seal mechanism 36 is disposed on a bell head side of the bearing clearance between the drive shaft 18 and the air bearing 17. The air seal mechanism 36 includes a seal air feed passage 34 communicating with the air feed passage 22 connected to the air bearing, a chamber 31 formed in the cover 35 so as to extend over an entire circumference of the cover 35 and communicating with the seal air feed passage 34, at least one orifice 32 communicating with the chamber 31, and a recess 33 formed in the cover 35 and extending in the circumferential direction of the cover 35 over the entire circumference of the cover 35 and communicating with the orifice 32. The recess 33 is opened radially inwardly. The chamber 31 and the recess 33 help in that air is supplied evenly in the circumferential direction in the chamber and the recess. The orifice 32 adjusts the amount of air injected through the orifice.

In the fifth embodiment of the present invention, since the cover 35 is provided, paint and/or thinner and foreign substance collides with the cover 35 to be prevented from directly entering the bearing clearance.

Paint and/or thinner and foreign substance cannot enter the bearing clearance without passing through a gap between the inside surface of the cover 35 and the outside surface of the drive shaft 18. Since air is injected from the inside surface of the cover 35 to from an air seal (air curtain) at the gap, the paint and/or thinner and foreign substance cannot pass through the gap. Therefore, the paint and/or thinner and foreign substance does not enter the air bearing 17.

If any imbalance in the circumferential direction of the cover exists in the amount of injected seal air, a portion having a lower pressure than adjacent portions may involve paint and or thinner and foreign substance. However, in the fifth embodiment of the present invention, since the chamber 31 and the recess 33 are formed in the cover 35, the amount of air injected from the recess is substantially even over the entire circumference of the cover, so that reliable sealing is obtained.

Further, the bearing air has a relatively high pressure, for example, a pressure of 4 $Kgf/cm^2$. On the other hand, the amount of air to be injected from the recess 33 may be small, so that the seal air passage has to be throttled. In the fifth embodiment of the present invention, since the orifice 32 is formed in the seal air passage, throttling is easy.

Further, since the air seal mechanism 36 is formed in the cover 35, a particular space does not need to be prepared for disposing the air seal mechanism. Since a portion of the bearing air is used for the seal air, an independent, particular air passage does not need to be provided in the air motor. As a result, the apparatus is compact. Further, a constant amount of seal air can be supplied to the seal mechanism.

According to the present invention, the following advantages are obtained:

First, since a divergence portion is formed in any one of the air feed passage to the air bearing, the turbine, and the shaping air cap so that a portion of the air flowing in the one air feed passage is caused to diverge for use as a paint reverse flow prevention air, it is not necessary to additionally provide a particular air feed passage for a paint reverse flow prevention air unlike the conventional apparatus. As a result, the apparatus according to the present invention is not accompanied by a size-up of the apparatus and a large cost increase.

Second, in the case where the upstream portion upstream of the divergence portion has a greater cross-section than the downstream portion of the divergence portion, even if the amount of air flowing in the air feed passage where the divergence portion is formed is increased by the amount necessary for the paint reverse flow prevention air, a pressure loss at the upstream portion of the air feed passage is small. As a result, the pressure at the inlet of any one of the air bearing, the turbine, and the shaping air cap is almost not affected (decreased) by the divergence of the paint reverse flow prevention air, so that the operation is stable.

Third, in the case where the air bearing is intercepted from the interior of the drive shaft by the axial gap and the radial gap, even if paint enters the interior of the drive shaft and reaches the rear end of the interior of the drive shaft, the paint is prevented from reaching the air bearing.

Fourth, in the case where a taper is formed in the inside surface of the drive shaft, even if paint and/or thinner enters the interior of the drive shaft, the paint and/or thinner can be exhausted to an outside utilizing a centrifugal force acting on the paint and/or thinner when the drive shaft is rotated at a high speed.

Fifth, in the case where a spiral groove is formed in the inside surface of the drive shaft, even if paint and/or thinner enters the interior of the drive shaft, the paint and/or thinner can be exhausted to the outside utilizing a pumping operation generated by the spiral groove when the drive shaft is rotated at a high speed.

Lastly, in the case where an air seal mechanism is provided on the bell head side of the bearing clearance, paint and/or thinner and foreign substance is prevented from entering the bearing clearance by an air seal (air curtain) generated by the air seal mechanism.

Although the present invention has been described with reference to specific exemplary embodiments, it will be appreciated by those skilled in the art that various modifications and alterations can be made to the particular embodiments shown, without materially departing from the novel teachings and advantages of the present invention. Accordingly, it is to be understood that all such modifications and alterations are included within the spirit and scope of the present invention as defined by the following claims.

What is claimed is:

1. A rotary atomizing electrostatic coating apparatus comprising:

a housing;

a hollow drive shaft mounted with respect to said housing and having an interior and a front end;

an air motor including an air bearing for floatingly supporting said drive shaft and a turbine for rotating said drive shaft;

a bell head coupled to said front end of said drive shaft so as to rotate together with said drive shaft;

a paint feed tube and a thinner feed tube extending through said drive shaft;

a shaping air cap for injecting shaping air, said shaping air cap being coupled to said housing;

a plurality of air feed passages disposed in said housing and connected to said air bearing, said turbine, and said shaping air cap, respectively, wherein at least one of said plurality of air feed passages includes a divergence portion, causing a portion of air flowing in said at least one of said air feed passages to diverge from said at least one air feed passage so that a diverging air flows to said interior of said drive shaft.

2. An apparatus according to claim 1, wherein said one air feed passage includes an upstream portion located upstream of said divergence portion and a downstream portion located downstream of said divergence portion, said upstream portion having a greater cross section than said downstream portion.

3. An apparatus according to claim 1, wherein said air bearing includes front and rear radial bearings and one thrust bearing, said radial bearings and said one thrust bearing rotatably and floatingly supporting said drive shaft, said thrust bearing being located between said radial bearings, said housing including on a rear side of said rear radial bearing a first housing portion where said divergence portion is disposed, said first housing portion and said drive shaft defining a radial gap therebetween, said drive shaft including a rear end, said housing having a second housing portion opposing said rear end of said drive shaft, said rear end of said drive shaft and said second housing portion defining an axial gap which communicates with said radial gap, said first housing portion having an air nozzle formed therein for causing said diverging air to flow into said radial gap.

4. An apparatus according to claim 3, wherein said radial gap has a greater gap thickness than said axial gap.

5. An apparatus according to claim 1, wherein said divergence portion is disposed in said air feed passage connected to said air bearing.

6. An apparatus according to claim 1, wherein said divergence portion is disposed in said air feed passage connected to said turbine.

7. An apparatus according to claim 1, wherein said drive shaft includes a portion having a tapered inside surface increasing in diameter in a direction toward said front end of said drive shaft.

8. An apparatus according to claim 1, wherein said drive shaft includes a portion having an inside surface, a spiral groove being formed in said inside surface, said groove spirally extending so as to approach said front end of said drive shaft in a direction reverse to a direction of rotation of said drive shaft.

9. An apparatus according to claim 1, wherein said drive shaft and said air bearing have a bearing clearance therebetween, and an air seal mechanism for forming an air curtain over an entire circumference around said drive shaft is disposed on a bell head side of said bearing clearance.

10. An apparatus according to claim 1, wherein said drive shaft and said air bearing have a bearing clearance therebetween, and further comprising a paint adhesion preventing cover covering said bearing clearance from a front side of said bearing clearance.

11. An apparatus according to claim 10, further comprising:

a seal air feed passage communicating with said air feed passage connected to said air bearing;

a chamber formed in said cover and extending in a circumferential direction of said cover over an entire circumference of said cover, said chamber communicating with said seal air feed passage;

at least one orifice formed in said cover and communicating with said chamber;

a recess formed in said cover and extending in a circumferential direction of said cover over an entire circumference of said cover, said recess opening radially inwardly and communicating with said at least one orifice.

* * * * *